US012331921B2

(12) United States Patent
Zhong et al.

(10) Patent No.: US 12,331,921 B2
(45) Date of Patent: Jun. 17, 2025

(54) MANUAL ADJUSTMENT CONTROL APPARATUS FOR WATERPROOF LAMP

(71) Applicant: Xiamen Topstar Lighting Co., Ltd., Xiamen (CN)

(72) Inventors: Xiaoyan Zhong, Xiamen (CN); Yongjie Wu, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 18/629,134

(22) Filed: Apr. 8, 2024

(65) Prior Publication Data

US 2024/0271778 A1 Aug. 15, 2024

(30) Foreign Application Priority Data

Mar. 25, 2024 (CN) ......................... 202420588768.4

(51) Int. Cl.
*F21V 23/04* (2006.01)
*F21V 31/00* (2006.01)

(52) U.S. Cl.
CPC ............ *F21V 31/005* (2013.01); *F21V 23/04* (2013.01)

(58) Field of Classification Search
CPC ............................... F21V 31/005; F21V 23/04
See application file for complete search history.

(56) References Cited

U.S. PATENT DOCUMENTS

| | | | | |
|---|---|---|---|---|
| 4,729,078 A * | 3/1988 | Skegin | .................... | F21V 23/02 362/373 |
| 9,458,994 B1 * | 10/2016 | Khubani | ............... | F21S 10/023 |
| 9,657,928 B1 * | 5/2017 | Jacobson | ............... | H05B 45/10 |
| 11,440,460 B1 * | 9/2022 | Spencer | ................ | F21S 41/657 |
| 2017/0159924 A1 * | 6/2017 | Khubani | ................. | F21V 29/70 |

FOREIGN PATENT DOCUMENTS

| | | |
|---|---|---|
| CN | 101893207 A * | 11/2010 |
| CN | 210810911 U * | 6/2020 |
| CN | 211040528 U * | 7/2020 |
| CN | 212510753 U * | 2/2021 |

* cited by examiner

*Primary Examiner* — Fatima N Farokhrooz
(74) *Attorney, Agent, or Firm* — Westbridge IP LLC

(57) ABSTRACT

A manual adjustment control apparatus, applied in a waterproof lamp, includes a rotating part and a toggling assembly; the lamp housing is provided with a through hole with a folding edge, the rotating part is in interference fit with the stepped edge by the sealing rings on the circumferential side wall; and the rotating part is in gear engagement with the toggling assembly, which is linked to a lamp switch, enabling the rotating part to toggle the lamp switch through the toggling assembly. Compared with a design of a linear lamp switch, the present disclosure ensures that there will be no great differences in magnitudes of interference on different positions of the sealing rings when using, and stable waterproofness and good operation hand feeling are achieved at the same time.

8 Claims, 3 Drawing Sheets

MANUAL ADJUSTMENT CONTROL APPARATUS FOR WATERPROOF LAMP

CROSS-REFERENCE TO RELATED APPLICATIONS

This application claims priority to Chinese Patent Application No. 202420588768.4, filed on Mar. 25, 2024, the content of which is incorporated herein by reference in its entirety.

TECHNICAL FIELD

The present disclosure relates to the technical field of lamp manufacture, in particular to a novel waterproof lamp.

BACKGROUND

Most of switches with lamps on the market are linearly toggled, and the waterproofness of switch parts thereof is realized by interference fit among a sliding block mechanism, a silicon rubber ring and a housing. During toggling, a compression force and a compression amount of the silicon rubber ring are changed. When a switch is toggled to one of two extreme positions, the pressure acting on the silicon rubber ring at the other extreme position will be the smallest, and the waterproof ability will also become the lowest, for which a product with a multi-gear-adjustable switch is especially obvious.

Moreover, since the sliding block mechanism is in interference fit with the silicon rubber ring, and a magnitude of interference will directly affect a waterproofing grade and the hand feeling of a lamp switch; if the magnitude of interference is not large enough, the waterproofness cannot be passed; and if the magnitude of interference is too large, the hand feeling of the lamp switch will be affected to result in difficulty in toggling.

SUMMARY

The technical problem to be solved by the present disclosure is to provide a novel waterproof lamp having stable waterproofness while having good operation hand feeling.

In order to solve the above-mentioned technical problem, the present disclosure adopts technical solutions.

Provided is a novel waterproof lamp, including a lamp housing and a lighting component located in the lamp housing, and further including a manual adjustment control apparatus; the manual adjustment control apparatus including a rotating part and a toggling assembly; the lamp housing being provided with a through hole, an edge of the through hole being provided with a folding edge, a circumferential side wall of the rotating part being provided with sealing rings, and the rotating part being in interference fit with the folding edge by the sealing rings; and an end, facing the inside of the lamp housing, of the rotating part being in meshed connection with the toggling assembly, the toggling assembly being connected to a lamp switch of the lighting component, and the rotating part toggling the lamp switch by means of the toggling assembly.

Further, the toggling assembly includes a mounting frame, a rack, and a toggling rod; and the mounting frame is disposed in the lamp housing, the rack is movably disposed on the mounting frame in a length direction of the rack, the rack is in meshed connection with the rotating part, one end of the toggling rod is connected to the rack, and the other end of the toggling rod is connected to the lamp switch.

Further, the mounting frame is provided with two sliding chutes oppositely disposed; and two ends of the rack are slidably disposed in the two sliding chutes, respectively.

Further, the rack is parallel to a direction in which a moving end of the lamp switch is toggled back; and the toggling rod is perpendicular to the rack, and the moving end of the lamp switch is clamped by an end, close to the lamp switch, of the toggling rod.

Further, the mounting frame is provided with an assembly part, and the mounting frame is detachably connected to the lamp housing by the assembly part.

Further, the lamp housing is provided with a circular groove, and the through hole is located in the bottom of the circular groove; and an end, facing the outside of the lamp housing, of the rotating part is provided with a rotating head adapted to the circular groove in diameter, and the rotating head is partially embedded into the circular groove.

Further, a circumferential side wall of the rotating head is provided with antiskid stripes.

Further, the rotating part is provided with limiting slots disposed around the circumferential side wall of the rotating part, and the sealing rings sleeve the limiting slots.

Further, at least two limiting slots and at least two sealing rings are provided, and the limiting slots correspond to the sealing rings one to one.

The present disclosure has the beneficial effects that: compared with a design of a linear lamp switch, the present disclosure provides the novel waterproof lamp which adopts rotation adjustment realized under cooperation among the rotating part, the toggling assembly and the lamp switch; the folding edge is in interference fit with the sealing rings, which ensures that water is not easy to enter the lamp; and at the same time, during rotation, there will be no great differences in magnitudes of interference on different positions of the sealing rings, and stable waterproofness and good operation hand feeling are achieved at the same time.

DETAILED DESCRIPTION OF THE EMBODIMENTS

Figure 1:
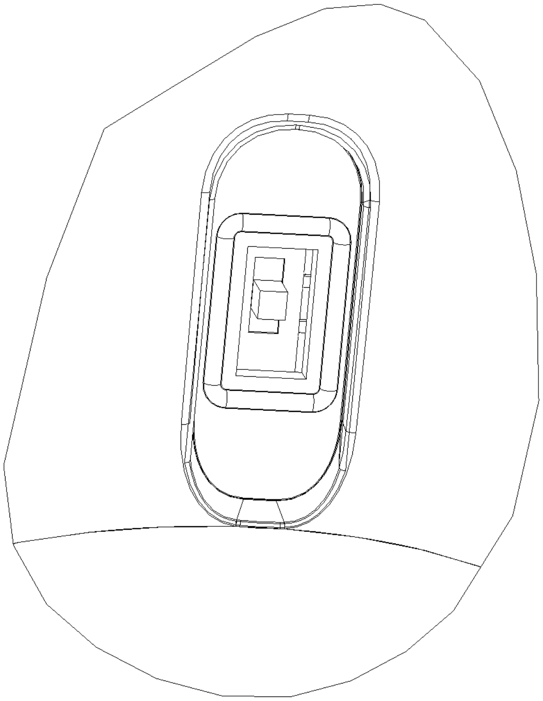
Fig. 1 (Prior Art)
FIG. 1 is a schematic structural diagram of an existing linear toggle switch.

In order to describe the technical contents as well as achieved objects and effects of the present disclosure in detail, the following description will be shown in conjunction with implementations and in cooperation with the accompanying drawings.

Refer to FIG. 2 to FIG. 5, provided is a novel waterproof lamp, including a lamp housing 1 and a lighting component located in the lamp housing 1, and further including a manual adjustment control apparatus; the manual adjustment control apparatus including a rotating part 3 and a toggling assembly; the lamp housing 1 being provided with a through hole 4, an edge of the through hole 4 being provided with a folding edge 5, a circumferential side wall of the rotating part 3 being provided with sealing rings 6, and the rotating part 3 being in interference fit with the folding edge 5 by the sealing rings 6; and an end, facing the inside of the lamp housing 1, of the rotating part 3 being in meshed connection with the toggling assembly, the toggling assembly being connected to a lamp switch 2 of the lighting component, and the rotating part 3 toggling the lamp switch 2 by means of the toggling assembly.

It can be known from the above-mentioned description that the present disclosure has the beneficial effects that compared with a design of a linear lamp switch 2, the present disclosure adopts rotation adjustment realized under cooperation among the rotating part 3, the toggling assembly and the lamp switch 2; the folding edge 5 is in interference fit with the sealing rings 6, which ensures that water is not easy to enter the lamp; and at the same time, during rotation, there will be no great difference in magnitudes of interference on different positions of the sealing rings 6, and stable waterproofness and good operation hand feeling are achieved at the same time.

Further, the toggling assembly includes a mounting frame 7, a rack 8, and a toggling rod 9; and the mounting frame 7 is disposed in the lamp housing 1, the rack 8 is movably disposed on the mounting frame 7 in a length direction of the rack 8, the rack 8 is in meshed connection with the rotating part 3, one end of the toggling rod 9 is connected to the rack 8, and the other end of the toggling rod 9 is connected to the lamp switch 2.

It can be known from the above-mentioned description that, by fixing the rack 8 in the lamp housing 1 by means of the mounting frame 7, it is convenient for the rack 8 to be meshed with and driven by the rotating part 3, stable driving is realized, and manual rotation adjustment for the lamp switch 2 is realized.

Further, the mounting frame 7 is provided with two sliding chutes 10 oppositely disposed; and two ends of the rack 8 are slidably disposed in the two sliding chutes 10, respectively.

It can be known from the above-mentioned description that, by disposing the sliding chutes 10, a guided support foundation can be provided for the movement of the rack 8, at the same time, the sliding chutes 10 have a limiting function and limit a stroke of the rotating part 3 rotated by a user to ensure that the stroke is correspondingly kept within a range of controlling a switch state of the lamp switch 2.

Further, the rack 8 is parallel to a direction in which a moving end of the lamp switch 2 is toggled back; and the toggling rod 9 is perpendicular to the rack 8, and the moving end of the lamp switch 2 is clamped by an end, close to the lamp switch 2, of the toggling rod 9.

It can be known from the above-mentioned description that the rack 8 is disposed to be parallel to the direction in which the moving end of the lamp switch 2 is toggled back, that is, when the rotating part 3 is rotated, the rack 8 is clamped by the toggling rod 9 to drive the moving end of the lamp switch 2 to move in the same direction, so that a linkage structure is simplified.

Further, the mounting frame 7 is provided with an assembly part 11, and the mounting frame 7 is detachably connected to the lamp housing 1 by the assembly part 11.

It can be known from the above-mentioned description that the mounting frame 7 is detachably fixed by the assembly part 11, so that it is convenient to replace and maintain accessories such as the rack 8 later.

Further, the lamp housing 1 is provided with a circular groove 12, and the through hole 4 is located in the bottom of the circular groove 12; and an end, facing the outside of the lamp housing 1, of the rotating part 3 is provided with a rotating head 13 adapted to the circular groove 12 in diameter, and the rotating head 13 is partially embedded into the circular groove 12.

It can be known from the above-mentioned description that, by disposing the circular groove 12 and the rotating head 13 cooperating with the circular groove 12, the area of contact between an edge of the rotating part 3 and the lamp housing 1 can be increased, and thus, the protection grade is improved; and at the same time, the rotating part 3 is assembled for stably and reliably.

Further, a circumferential side wall of the rotating head 13 is provided with antiskid stripes 14.

It can be known from the above-mentioned description that, by disposing the antiskid stripes 14, a friction force generated together with a hand of a person during rotation can be increased, slip is avoided, and the use experience of a user is improved.

Further, the rotating part 3 is provided with limiting slots 15 disposed around the circumferential side wall of the rotating part 3, and the sealing rings 6 sleeve the limiting slots 15.

It can be known from the above-mentioned description that, by disposing the limiting slots 15, the situation that the waterproofness of the lamp is affected due to position offset of the sealing rings 6 can be avoided, and especially, it is ensured that the sealing rings 6 are kept in a state of being attached to the folding edge 5 during rotation.

Further, at least two limiting slots 15 and at least two sealing rings 6 are provided, and the limiting slots 15 correspond to the sealing rings 6 one to one.

It can be known from the above-mentioned description that, by disposing the multi-layer sealing rings 6, multi-layer protection can be provided, and the phenomenon of local water seepage is avoided.

Figure 2:
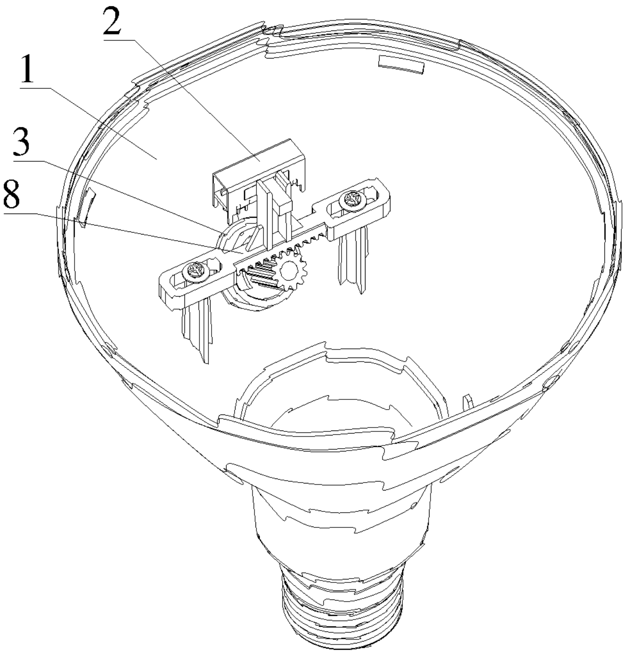
FIG. 2 is a schematic diagram of assembly of a manual adjustment control apparatus of a novel waterproof lamp in a lamp housing in the present disclosure.
Figure 3:
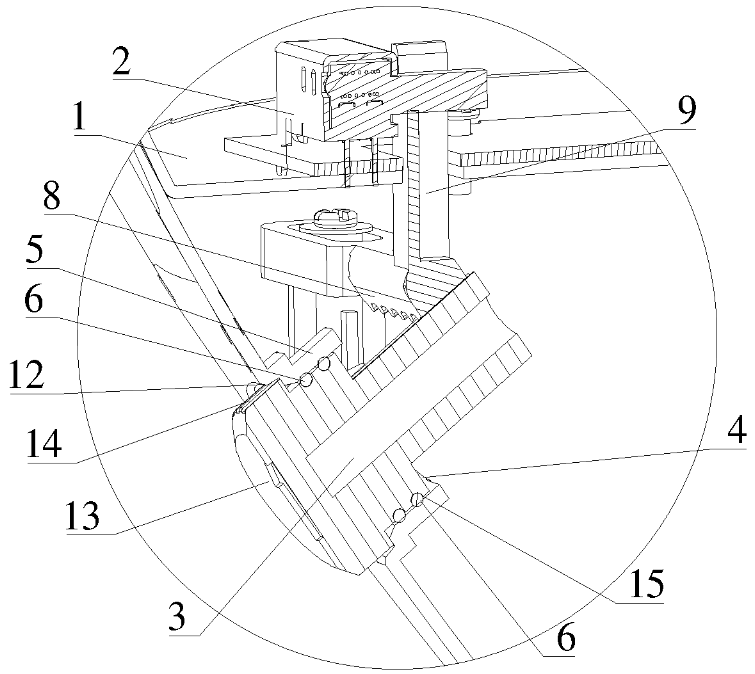
FIG. 3 is a schematic sectional diagram of assembly of a manual adjustment control apparatus of a novel waterproof lamp in a lamp housing in the present disclosure.

Refer to FIG. 2 to FIG. 5, embodiment 1 of the present disclosure is that: provided is a novel waterproof lamp, as shown in FIG. 2 and FIG. 3, including a lamp housing 1 and a lighting component located in the lamp housing 1, and further including a manual adjustment control apparatus; the manual adjustment control apparatus including a rotating part 3 and a toggling assembly; the lamp housing 1 being provided with a through hole 4, an edge of the through hole 4 being provided with a folding edge 5, a circumferential side wall of the rotating part 3 being provided with sealing rings 6, and the rotating part 3 being in interference fit with the folding edge 5 by the sealing rings 6; and an end, facing the inside of the lamp housing 1, of the rotating part 3 being in meshed connection with the toggling assembly, the toggling assembly being connected to a lamp switch 2 of the lighting component, and the rotating part 3 toggling the lamp switch 2 by means of the toggling assembly.

The toggling assembly includes a mounting frame 7, a rack 8, and a toggling rod 9; and the mounting frame 7 is disposed in the lamp housing 1, the rack 8 is movably disposed on the mounting frame 7 in a length direction of the rack 8, the rack 8 is in meshed connection with the rotating part 3, one end of the toggling rod 9 is connected to the rack 8, and the other end of the toggling rod 9 is connected to the lamp switch 2.

Figure 4:
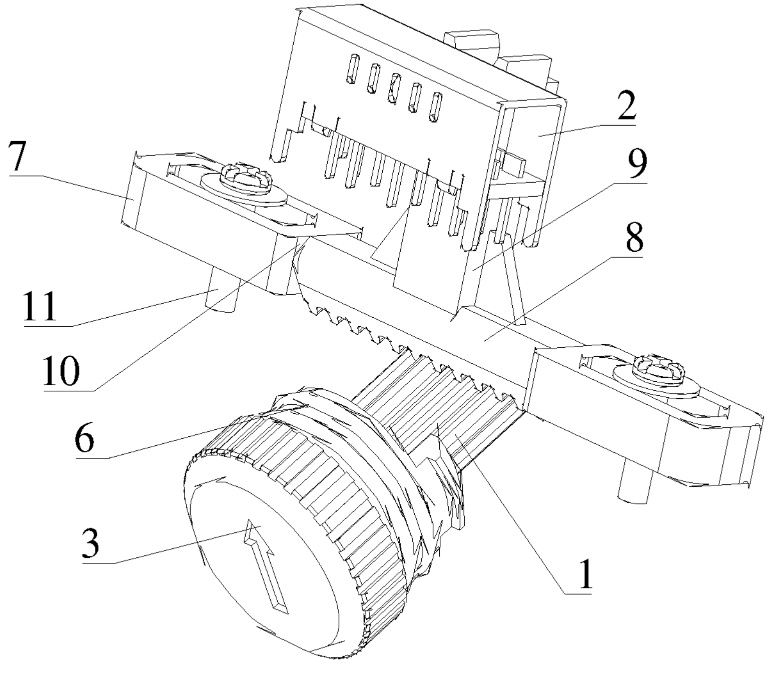
FIG. 4 is a first structural diagram of a manual adjustment control apparatus of a novel waterproof lamp in a lamp housing in the present disclosure.

In the present embodiment, a use process of the novel waterproof lamp is that: when the lamp needs to be turned on, as shown in FIG. 3 and FIG. 4, a user rotates the rotating part 3, an end, facing the inside of the lamp housing 1, of the rotating part 3 is provided with a gear, and the rack 8 is controlled to move by means of meshed connection between the gear and the rack 8, thereby driving the toggling rod 9 to toggle a moving end of the lamp switch 2 to complete the turning-on of the lamp; during rotation, since a design of rotation is adopted as a whole, magnitudes of interference on all positions of the sealing rings 6 cannot be changed too much, and there will be no increasing resistance to rotation; compared with a linear toggle switch, the switch can remarkably improve the operation experience of the user; and at the same time, a state of tight attachment between each of the sealing rings 6 and the folding edge 5 will not be changed too much, so that the lamp keeps good waterproofness. Moreover, in order to improve the waterproofness, the rotating part 3 is provided with limiting slots 15 disposed around the circumferential side wall of the rotating part 3, and the sealing rings 6 sleeve the limiting slots 15. At least two limiting slots 15 and at least two sealing rings 6 are provided, and the limiting slots 15 correspond to the sealing rings 6 one to one.

Figure 5:
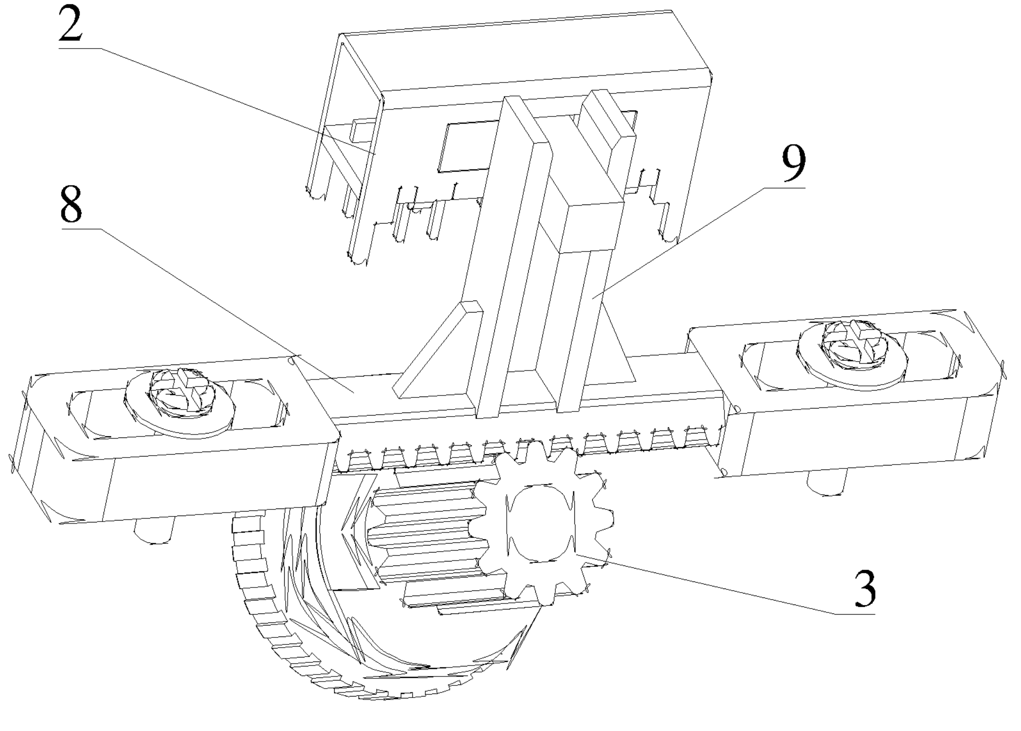
FIG. 5 is a second structural diagram of a manual adjustment control apparatus of a novel waterproof lamp in a lamp housing in the present disclosure.

In the present embodiment, as shown in FIG. 4 and FIG. 5, the mounting frame 7 is provided with two sliding chutes 10 oppositely disposed; and two ends of the rack 8 are slidably disposed in the two sliding chutes 10, respectively. The rack 8 is parallel to a direction in which the moving end of the lamp switch 2 is toggled back; and the toggling rod 9 is perpendicular to the rack 8, and the moving end of the lamp switch 2 is clamped by an end, close to the lamp switch 2, of the toggling rod 9. The mounting frame 7 is divided into a left part and a right part with each being provided with one of the sliding chutes 10 in aligned cooperation with ends of the rack 8, and during rotation, the rack 8 moves back and forth between the two sliding chutes 10.

At the same time, the mounting frame 7 is provided with an assembly part 11, and the mounting frame 7 is detachably connected to the lamp housing 1 by the assembly part 11. As shown in a figure, the assembly part 11 is preferably a retaining screw and is locked and fixed by disposing a corresponding mounting hole in the lamp housing 1.

In the present embodiment, the lamp housing 1 is provided with a circular groove 12, and the through hole 4 is located in the bottom of the circular groove 12; and an end, facing the outside of the lamp housing 1, of the rotating part 3 is provided with a rotating head 13 adapted to the circular groove 12 in diameter, and the rotating head 13 is partially embedded into the circular groove 12.

In conclusion, compared with a design of a linear lamp switch, the novel waterproof lamp provided in the present disclosure adopts rotation adjustment realized under cooperation among the rotating part, the toggling assembly and the lamp switch. Specifically, a rotational movement is converted into linear movement by means of a driving structure between the gear and the rack; the folding edge is in interference fit with the sealing rings, which ensures that water is not easy to enter the lamp; and the rotating part is provided with the limiting slots to tightly sleeve the sealing rings. During rotation, there will be no great difference in magnitudes of interference on different positions of the sealing rings, and stable waterproofness and good operation hand feeling are achieved at the same time.

Above descriptions are merely embodiments of the present disclosure, and are not intended to hence limit the patent scope of the present disclosure. Any equivalent transformations made according to the contents of the description and the accompanying drawings of the present disclosure are directly or indirectly applied to the related art and also fall within the patent protection scope of the present disclosure in a similar way.

What is claimed is:

1. A manual adjustment control apparatus, applied in a waterproof lamp, comprising a rotating part and a toggling assembly;

the manual adjustment control apparatus being provided in a lamp housing of the waterproof lamp;

the lamp housing being provided with a through hole, an edge of the through hole being provided with a stepped edge, a circumferential side wall of the rotating part being provided with sealing rings, and the rotating part being in interference fit with the stepped edge by the sealing rings;

wherein, an end, facing the inside of the lamp housing, of the rotating part is in gear engagement with the toggling assembly, the toggling assembly being is connected to a lamp switch, and the rotating part is configured for toggling the lamp switch via the toggling assembly;

the toggling assembly comprises a mounting frame, a rack, and a toggling rod; the rack is movably disposed on the mounting frame in a length direction of the rack, the rack is in gear engagement with the rotating part, one end of the toggling rod is connected to the rack, and the other end of the toggling rod is connected to the lamp switch; and the rack is parallel to a direction in which a moving end of the lamp switch is toggled back; and the toggling rod is perpendicular to the rack.

2. The manual adjustment control apparatus according to claim 1, wherein the mounting frame is provided with two sliding chutes oppositely disposed; and two ends of the rack are slidably disposed in the two sliding chutes, respectively.

3. The manual adjustment control apparatus according to claim 1, wherein the moving end of the lamp switch is clamped by an end, close to the lamp switch, of the toggling rod.

4. The manual adjustment control apparatus according to claim 1, wherein the mounting frame is provided with an assembly part, and the mounting frame is detachably connected to the lamp housing by the assembly part.

5. The manual adjustment control apparatus according to claim 1, wherein the lamp housing is provided with a circular groove, and the through hole is located in the bottom of the circular groove; and an end, facing the outside of the lamp housing, of the rotating part is provided with a rotating head adapted to the circular groove in diameter, and the rotating head is partially embedded into the circular groove.

6. The manual adjustment control apparatus according to claim 1, wherein the rotating part is provided with limiting slots disposed around the circumferential side wall of the rotating part, and the sealing rings sleeve the limiting slots.

7. The manual adjustment control apparatus according to claim 5, wherein a circumferential side wall of the rotating head is provided with antiskid stripes.

8. The manual adjustment control apparatus according to claim 6, wherein at least two limiting slots and at least two sealing rings are provided, and the limiting slots correspond to the sealing rings one to one.

* * * * *